(12) United States Patent
Tao et al.

(10) Patent No.: US 11,868,184 B2
(45) Date of Patent: Jan. 9, 2024

(54) METAL BACKPLATE AND FOLDABLE DISPLAY USING THE SAME

(71) Applicant: DARWIN PRECISIONS CORPORATION, Hsinchu County (TW)

(72) Inventors: Ching Wen Tao, Hsinchu County (TW); Wen Yi Lin, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 119 days.

(21) Appl. No.: 17/307,679

(22) Filed: May 4, 2021

(65) Prior Publication Data

US 2022/0300039 A1 Sep. 22, 2022

(30) Foreign Application Priority Data

Mar. 17, 2021 (TW) .................................. 110109453

(51) Int. Cl.
*G06F 1/16* (2006.01)

(52) U.S. Cl.
CPC .......... *G06F 1/1656* (2013.01); *G06F 1/1616* (2013.01); *G06F 1/1652* (2013.01)

(58) Field of Classification Search
CPC ...... G06F 1/1656; G06F 1/1616; G06F 1/1652
See application file for complete search history.

(56) References Cited

U.S. PATENT DOCUMENTS

| | | | | |
|---|---|---|---|---|
| 11,227,515 | B2 * | 1/2022 | Kim | G06F 1/1616 |
| 11,416,032 | B2 * | 8/2022 | Jung | G02F 1/133305 |
| 2015/0055287 | A1 * | 2/2015 | Seo | G06F 1/1641 |
| | | | | 361/679.27 |
| 2021/0165447 | A1 * | 6/2021 | Wang | G06F 1/1616 |
| 2021/0165454 | A1 * | 6/2021 | Dong | G06F 1/1652 |
| 2022/0293870 | A1 * | 9/2022 | Park | H10K 77/111 |
| 2022/0309964 | A1 * | 9/2022 | Wang | H05K 7/1438 |

\* cited by examiner

*Primary Examiner* — Rockshana D Chowdhury
(74) *Attorney, Agent, or Firm* — Muncy, Geissler, Olds & Lowe, P.C.

(57) ABSTRACT

A metal backplate is composed of two parallel plain parts and a flexible part lying two plain parts, and the flexible part has a first surface and a second surface deployed underneath the first surface. The flexible part is etched or etched partially with a plurality of curved first openings which form a first array in a staggered arrangement in order to weaken the flexible part B with rigidity property to be one with bending-resilience property; at the same time, which form in staggered rows or in alignments on the upside and the reverse side of the first surface in order to decrease the unidirectional stress concentration and the warpage problem of the display panel.

9 Claims, 4 Drawing Sheets

METAL BACKPLATE AND FOLDABLE DISPLAY USING THE SAME

BACKGROUND OF THE INVENTION

1. Field of the Invention

This invention relates to a metal backplate having a foldable structure with bending-resilience property in order to meet a flattening surface demand.

2. Description of the Related Art

The foldable stainless metal backplates, listed for sale, have thicknesses between 30~150 μm processed by wet etching on the flexible parts, and normally have plain surfaces. However, it requires the stainless metal backplates to have a thickness of 40 μm with tensile strength over 2000 N/mm^2 or to be etched patterns on the flexible parts for having an enhanced bending resilience property to be able to pass the folding times test.

Nevertheless, that when the tensile strength of the stainless backplates have a thickness of 40 μm been enhanced over 2000 N/mm" 2 will lead to the backplates too rigid to withstand a 200K times folding test, and that when the flexible parts have been etched with patterns will cause internal stress change so as to crook the metal backplates and fail a flattening maintenance of the metal backplate.

SUMMARY OF THE INVENTION

Based on the aforementioned defects, this invention aims to provide a metal backplate having a foldable structure with bending resilience to meet the demand of the flattening maintenance of the metal backplate.

Based on the purpose of this invention, which provides the metal backplate having two plain parts along its longitudinal direction, and a flexible part lying between the plain parts and having a thickness less than that of the plain parts. The plain parts and the flexible part have a thickness difference between 20~40 μm.

The flexible part is composed of a first surface and a second surface deployed underneath the first surface. The first surface is etched or etched partially with a plurality of curved first openings forming a first array in staggered arrangement. The total area of the first openings amount to 45%~86% of that of the first area. Preferably, the first openings are etched in S-shape, and the total area of first openings amount to 80%~85% of that of first area.

Wherein, the metal backplate has a width Y perpendicular to its longitudinal direction X, a first opening having a width W parallel to the width direction Y, a first span P1 spacing out the adjacent first spans P1, and the width W is triple of the first span P1.

Besides, the first opening has a length L parallel to the longitudinal direction X, and a second span P2 spaces out the adjacent first openings. The length L is longer than the second span P2.

Furthermore, the second surface is etched a multiple of first openings forming a second array in staggered arrangement, and the first openings on the first array and on the second array are arranged in staggered rows along the longitudinal direction X.

Preferably, the flexible part has a thickness less than 35 μm after etching process. Besides, the plain parts have at least one surface etched with a plurality of second openings forming a third array, and a third span spaces out the adjacent second openings. The third spans keep a fixed distance or a gradually increased distance as being away from the flexible part.

This invention further provides a foldable display panel device including a display panel and the aforesaid metal backplate deployed underneath the display panel.

DETAILED DESCRIPTION OF PREFERRED EMBODIMENTS

For a better understand of the embodiment, the structure and the performance of this invention; hereinafter, the embodiments along with the illustrations will be stated accordance with the specification.

Figure 1:
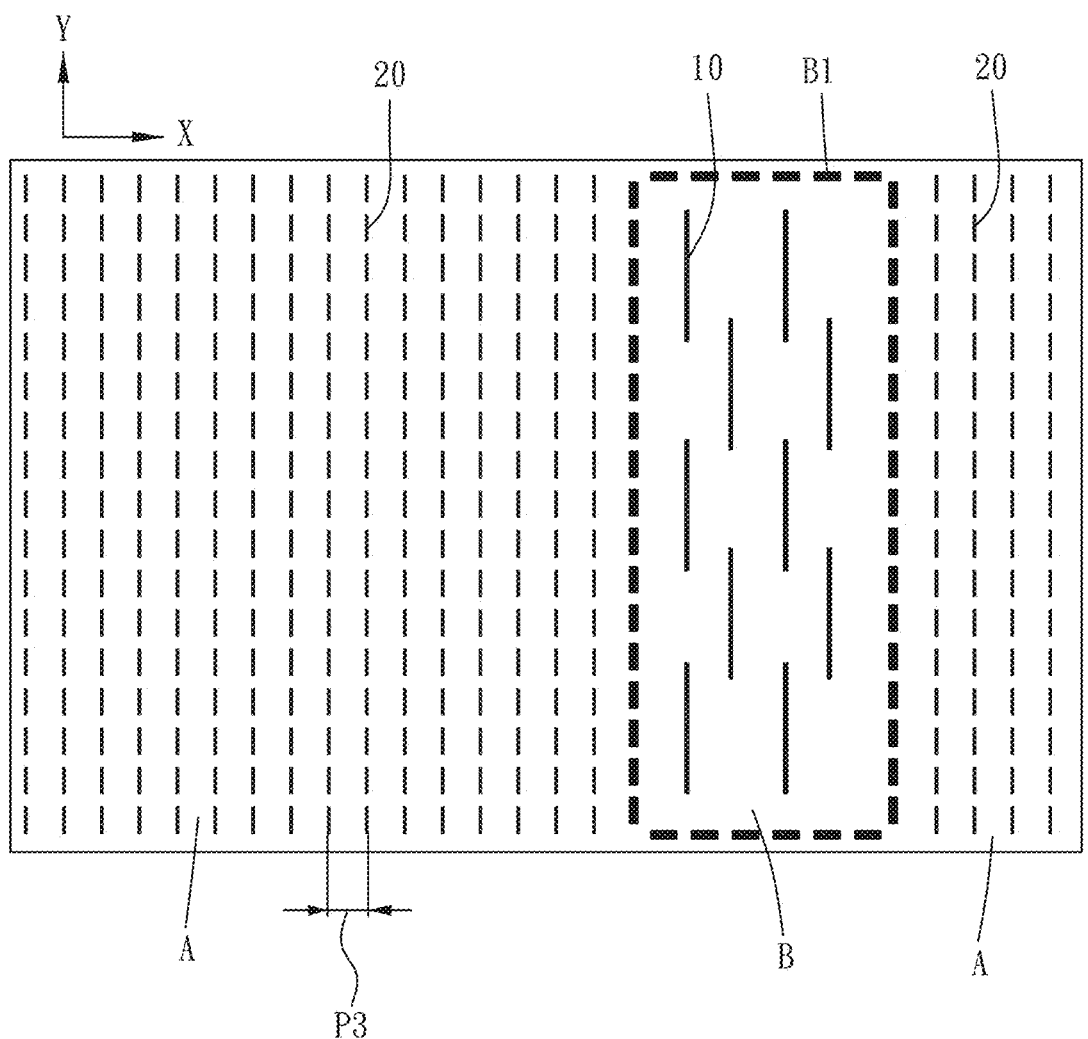
FIG. 1 illustrates an embodiment of a metal backplate of this invention.

Please refer to the FIG. 1, which illustrates a metal backplate having two plain parts A along a longitudinal direction X, and a flexible part B lying between the plain parts A and having a thickness less than that of the plain parts A. The thickness difference between the plain parts A and flexible part B is 20~40 μm. The flexible part B has a first surface B1 and a second surface B2, the first surface B1 being etched or partial etched a plurality of curved first openings 10 forming a first array in staggered arrangement, and the total area of the first openings 10 amounts to 45%~86% of that of the first surface B1.

Figure 2:
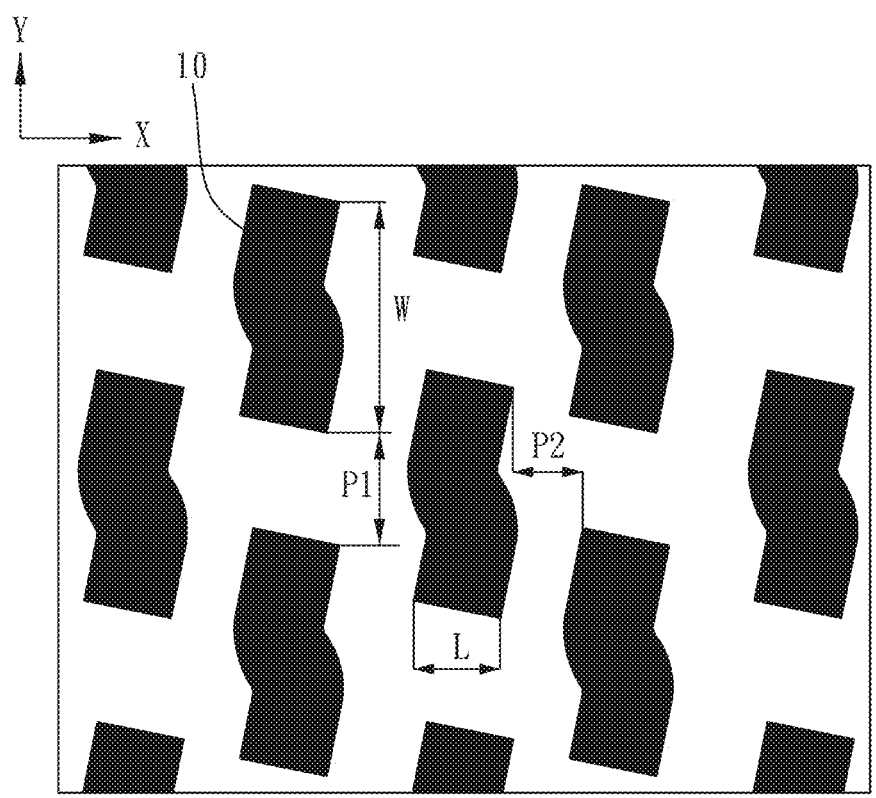
FIG. 2 illustrates an embodiment of a flexible part after etching process of a metal backplate of this invention.

Please refer to FIG. 2, which illustrates an etching schematic diagram of the first openings 10. In this embodiment, the first openings 10 are arranged in S shape after etching or partial etching process to weaken flexible part B with rigidity property to be one with bending resilience in order to pass folding endurance test. Furthermore, the total area of the first openings 10 amounts to 80%~85% of that of the first surface B1. In other embodiment, the first openings 10 may be etched in L shape, or an overlaid beans shape.

The metal backplate has a width direction Y rectangular to a longitudinal direction X, and the first opening 10 has a width W parallel to the width direction Y. The first span P1 spaces out the adjacent first openings 10 along the width direction Y. The width W is in triple of the first span P1.

Besides, the first openings 10 has a length L parallel to the longitudinal direction X, and a second span P2 spaces out the adjacent first openings 10 along the longitudinal direction X. The length L is longer than the second span P2.

Figure 3:
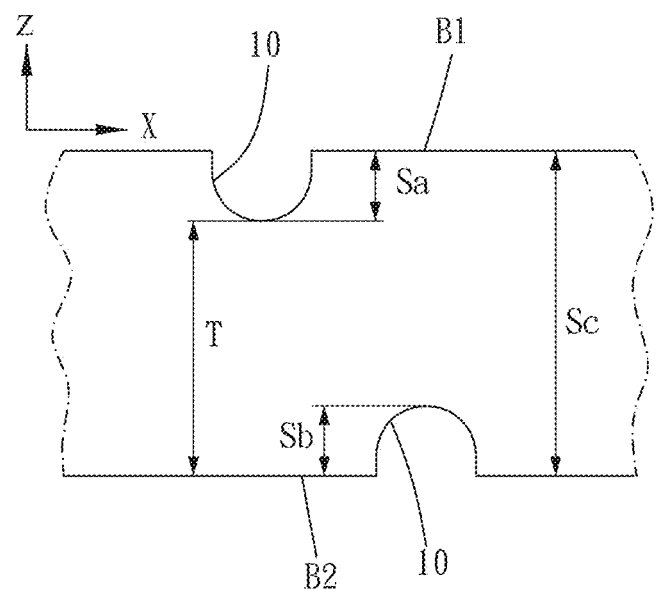
FIG. 3 illustrates an embodiment of the flexible part which is etched in staggered rows on the upside and the reverse side of the metal backplate of this invention.

The second surface B2 is etched a plurality of the first openings 10 forming the second array in staggered arrangement, and the first openings 10 on the first array and on the second array are staggered in rows along the longitudinal direction X. Please refer to FIG. 3, the flexible part B is etched in staggered arrangement on the upside and the reverse side in this embodiment; in other words, the first openings 10 on the first surface B1 and on the second surface B2 have the same or different diameters and are etched in staggered rows in order to reduce a unidirectional stress concentration and to improve a warpage problem. The flexible part B has a thickness less than 35 μm after etching process which satisfies below formula:

$$0 \leq Sa+Sb \leq 2Sc, \text{when } Sc-Sa \leq 35(\mu m), Sc-Sb \leq 35(\mu m)$$

Wherein, the Sa is the depth of the first openings 10 on the first surface B1 of the metal backplate, Sb being the depth of the first openings 10 on the second surface B2 and Sc is the thickness of the metal backplate.

Figure 4:
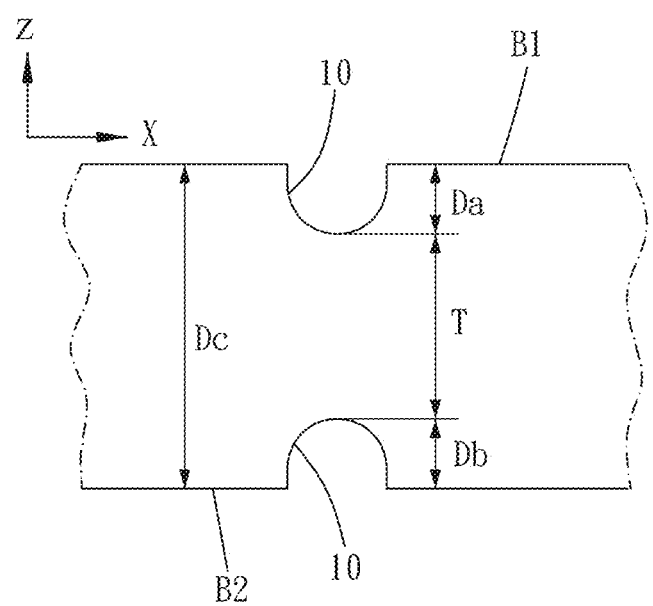
FIG. 4 illustrates an embodiment of the flexible part which is etched in alignment on the upside and the reverse side of the metal backplate of this invention.

Please refer to FIG. 4, the flexible part B is etched in alignment on the upside and the reverse side in order to reduce unidirectional stress concentration and improve the warpage problem. The flexible part B having a thickness T less than or equal to 35 μm which satisfies below formula:

$$0 \leq Da+Db \leq Dc, \text{when} Da+Db \leq Dc(\mu m),$$
$$Dc-(Da+Db) \leq 35(\mu m)$$

Wherein, Da is the etching depth of the first opening 10 on the first surface B1 of the metal backplate, Db being the etching depth of the first opening 10 on the second surface B2 of the metal backplate and Dc is the thickness of the metal backplate.

In this embodiment, the preferable etching depth of the Da and the Db is 20 μm, shown as in table 1, while the others have depths over 20 μm failing to achieve an ideal bending performance as 20 μm, shown as in table 1.

TABLE 1

| Etching depth of bending test | | |
|---|---|---|
| Etching depth(μm) | R angle | Bending times(K) |
| 20 | 1.5 | >200 |
| 37 | 2 | 160 |
| 43 | 2 | 52 |
| 51 | 2 | 49 |

Figure 5:
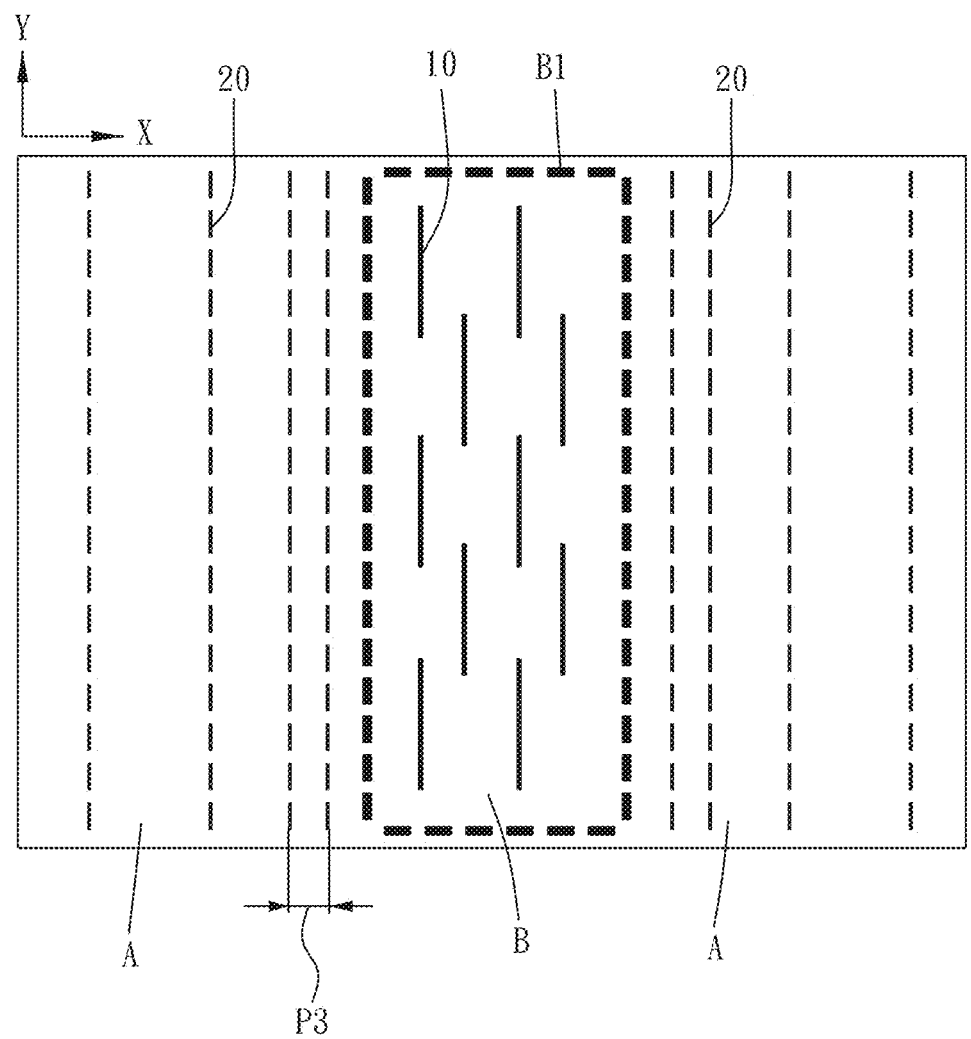
FIG. 5 illustrates another embodiment of the metal backplate of this invention.

Furthermore, at least one of the plain parts A has etched a plurality of the second openings 20 forming the third array, and the third span P3 spaces out the adjacent second openings 20 and keeps a fixed distance or a gradually increased distance as being away from the flexible part B. Please refer to FIG. 5, the third array becomes more intensive as the third spans P3 come closer to the flexible part B for having a property of bending resilience and keeping a fattening surface near the flexible part and avoiding warpage problem when the metal backplate folds.

This invention further provides a foldable display panel device including a display panel and the aforesaid metal backplate deployed underneath the display panel. In order to decrease the unidirectional stress concentration and to improve the warpage problem of the metal backplate, the first openings 10 are etched in S shape, arranged in staggered arrangement and in staggered rows on the upside and the reverse side of the flexible part B to meet the demand of the metal backplate with bending resilience yielded by rigidity property.

What is claimed is:

1. A metal backplate comprising two plain parts along its longitudinal direction and a flexible part lying between two plain parts, the flexible part having a first surface and a second surface underneath the first surface, the first surface being etched or etched partially a plurality of curved first openings forming a first array in staggered arrangement, and the total area of the first openings amount to 45%~86% of that of the first surface;

wherein the second surface has etched a plurality of the first openings forming a second array in staggered arrangement, and the first openings on the first array and on the second array are in staggered arrangement;

wherein each etching depth of the first openings of the first array and each etching depth of the first openings of the second array is 20 μm;

wherein a width direction is rectangular to the longitudinal direction, the first openings having a width parallel to the width direction, a first span lying between the adjacent first openings along the width direction and the width being in triple of the first span;

wherein each of the first openings not extending completely through the flexible part of the metal backplate.

2. The metal backplate according to claim 1, wherein the first openings have a total area amounting to 80%~85% of that of the first surface.

3. The metal backplate according to claim 1, wherein the first openings are etched in S shape, L shape or overlaid beans shape.

4. The metal backplate according to claim 1, wherein the first openings have a length parallel to the longitudinal direction, a second span lying between the adjacent first openings and the length is longer than the second span.

5. The metal backplate according to claim 1, wherein the thickness of the flexible part is less than that of the plain parts and the thickness difference between the flexible part and the plain parts is between 20~40 μm.

6. The metal backplate according to claim 1, wherein the flexible part has a thickness is smaller or equal to 35 μm after etching process.

7. The metal backplate according to claim 1, wherein the plain parts have etched a plurality of the second openings forming the third array.

8. The metal backplate according to claim 7, wherein the third spans between the adjacent second openings keep a fixed distance or a gradually increased distance as being away from the flexible part.

9. A foldable display panel device comprising a display backplate and at least one metal backplate as mentioned in the claim 1 deployed underneath the display panel.

* * * * *